(12) United States Patent
Hong et al.

(10) Patent No.: US 10,430,632 B2
(45) Date of Patent: Oct. 1, 2019

(54) DISPLAY DEVICE AND DRIVING METHOD THEREOF

(71) Applicant: Samsung Display Co., Ltd., Yongin-si, Gyeonggi-do (KR)

(72) Inventors: Won Ki Hong, Yongin-si (KR); Jong Seo Lee, Yongin-si (KR)

(73) Assignee: Samsung Display Co., Ltd. (KR)

( * ) Notice: Subject to any disclaimer, the term of this patent is extended or adjusted under 35 U.S.C. 154(b) by 99 days.

(21) Appl. No.: 15/402,019

(22) Filed: Jan. 9, 2017

(65) Prior Publication Data

US 2017/0200037 A1    Jul. 13, 2017

(30) Foreign Application Priority Data

Jan. 11, 2016 (KR) .................. 10-2016-0003218

(51) Int. Cl.
| | | |
|---|---|---|
| *G06K 9/00* | (2006.01) | |
| *G06F 3/041* | (2006.01) | |
| *G06F 3/044* | (2006.01) | |
| *H04N 1/44* | (2006.01) | |
| *G06F 3/0488* | (2013.01) | |

(52) U.S. Cl.
CPC .......... *G06K 9/0002* (2013.01); *G06F 3/044* (2013.01); *G06F 3/0412* (2013.01); *G06F 3/0416* (2013.01); *G06F 3/04883* (2013.01); *H04N 1/442* (2013.01); *G06F 2203/04105* (2013.01); *G06F 2203/04106* (2013.01)

(58) Field of Classification Search
CPC ............ G06Q 20/40145; G06Q 20/401; G06F 3/03547; G06F 3/0416

USPC ........ 382/115, 116, 124, 209, 278; 340/340, 340/5.52, 5.53, 5.83

See application file for complete search history.

(56) References Cited

U.S. PATENT DOCUMENTS

| | | | | |
|---|---|---|---|---|
| 6,712,698 B2 * | 3/2004 | Paulsen | ............... | G06F 3/04883 463/16 |
| 7,222,206 B2 * | 5/2007 | Kee | ....................... | G06F 1/1616 710/303 |
| 7,420,546 B2 * | 9/2008 | Abdallah | ................ | G06F 21/32 345/173 |

(Continued)

FOREIGN PATENT DOCUMENTS

| | | |
|---|---|---|
| KR | 10-2001-0084641 A | 9/2001 |
| KR | 10-2006-0053699 A | 5/2006 |

(Continued)

*Primary Examiner* — Yosef Kassa
(74) *Attorney, Agent, or Firm* — Innovation Counsel LLP

(57) ABSTRACT

An exemplary embodiment of the present inventive concept provides a display device including: a display unit including a plurality of pixels disposed on a display area; a display controller configured to control the display unit; a sensor including a plurality of first sensing electrodes and a plurality of second sensing electrodes disposed in the display area; and a sensor controller configured to recognize a touch of a user inputted into the sensor in a touch sensing mode and to recognize a fingerprint of the user inputted into the sensor in a fingerprint sensing mode, wherein the sensor controller changes a mode to the fingerprint sensing mode when no touch is inputted for a predetermined time period in the touch sensing mode and changes the mode to the touch sensing mode when authorization on a fingerprint inputted into the sensor is succeeded in the fingerprint sensing mode.

18 Claims, 13 Drawing Sheets

(56) References Cited

U.S. PATENT DOCUMENTS

| | | | |
|---|---|---|---|
| 7,550,707 B2 * | 6/2009 | Hashimoto | G06K 9/20 250/221 |
| 7,697,729 B2 * | 4/2010 | Howell | G06K 9/00013 345/156 |
| 7,708,191 B2 * | 5/2010 | Vega | G06Q 20/10 235/379 |
| 8,058,603 B2 * | 11/2011 | Park | G02F 1/1362 250/208.2 |
| 8,063,889 B2 * | 11/2011 | Anderson | G06F 3/04886 345/172 |
| 8,335,353 B2 * | 12/2012 | Yamamoto | A61B 5/117 382/115 |
| 8,378,993 B2 | 2/2013 | Li et al. | |
| 8,443,199 B2 * | 5/2013 | Kim | G06F 3/03547 345/173 |
| 8,552,989 B2 | 10/2013 | Hotelling et al. | |
| 8,601,876 B2 | 12/2013 | Schneider et al. | |
| 8,614,676 B2 * | 12/2013 | Chiang | G06F 1/1626 345/156 |
| 8,670,599 B2 | 3/2014 | Lee et al. | |
| 8,724,038 B2 * | 5/2014 | Ganapathi | G02B 26/0833 345/173 |
| 8,780,060 B2 | 7/2014 | Maschmeyer et al. | |
| 8,792,062 B2 | 7/2014 | Hwang et al. | |
| 8,891,048 B2 | 11/2014 | Park et al. | |
| 8,972,299 B2 * | 3/2015 | Kelley | G07F 17/3206 705/51 |
| 9,042,971 B2 * | 5/2015 | Brumback | A61B 5/02438 600/509 |
| 9,224,029 B2 | 12/2015 | Setlak | |
| 9,459,704 B2 | 10/2016 | Min | |
| 2011/0156865 A1 | 6/2011 | Baek et al. | |
| 2012/0105337 A1 | 5/2012 | Jun et al. | |
| 2014/0247239 A1 | 9/2014 | Jamshidi-Roudbari et al. | |
| 2014/0258904 A1 | 9/2014 | Ku | |
| 2015/0036065 A1 | 2/2015 | Yousefpor et al. | |
| 2015/0135108 A1 | 5/2015 | Pope et al. | |
| 2015/0177884 A1 | 6/2015 | Han | |

FOREIGN PATENT DOCUMENTS

| | | |
|---|---|---|
| KR | 10-0700815 B1 | 3/2007 |
| KR | 10-1032863 B1 | 5/2011 |
| KR | 10-1054993 B1 | 8/2011 |
| KR | 10-1160452 B1 | 6/2012 |
| KR | 10-1163747 B1 | 7/2012 |
| KR | 10-2012-0097761 A | 9/2012 |
| KR | 10-1230146 B1 | 2/2013 |
| KR | 10-1230196 B1 | 2/2013 |
| KR | 10-2013-0081785 A | 7/2013 |
| KR | 10-2014-0033839 A | 3/2014 |
| KR | 10-2014-0111188 A | 9/2014 |
| KR | 10-2015-0073539 A | 7/2015 |
| KR | 10-1627914 B1 | 6/2016 |

\* cited by examiner

PRESSURE INCREASES →

DISPLAY DEVICE AND DRIVING METHOD THEREOF

CROSS-REFERENCE TO RELATED APPLICATION

This application claims priority to and the benefit of Korean Patent Application No. 10-2016-0003218 filed in the Korean Intellectual Property Office on Jan. 11, 2016, the entire contents of which are incorporated herein by reference.

BACKGROUND

1. Field

An exemplary embodiment of the present inventive concept relates to a display device including a sensor capable of recognizing a touch and a fingerprint and a driving method thereof.

2. Description of the Related Art

Recently, a personal authentication method using a fingerprint, which is one of characteristic features of the individual, has been widely used.

As a method of implementing a fingerprint sensor, various recognition methods such as an optical type, a thermally sensitive type, and a capacitive type are known.

In the case of the capacitive fingerprint sensor among them, it is possible to obtain a fingerprint pattern by detecting a capacitive variation depending on valley and ridge shapes of a fingerprint of a user's finger surface when the user's finger surface contacts a capacitive sensor.

In recent years, through a mobile device, various additional functions such as finance and security using personal information as well as communication functions such as a phone service and a text message sending service are provided. Accordingly, mobile devices including fingerprint sensors are also wisely used in order to limit the access of other persons.

However, a conventional fingerprint sensor needs to have an additional space because it has a hardware structure that is separated from a display device. Accordingly, additional cost and efforts are required to individually develop and manufacture the fingerprint sensor and the display device.

SUMMARY

An exemplary embodiment of the has been made in an effort to provide a display device including both a touch recognizing function and a fingerprint recognizing function, and a driving method thereof.

An exemplary embodiment of the present inventive concept provides a display device including: a display unit including a plurality of pixels disposed on a display area; a display controller configured to control the display unit; a sensor including a plurality of first sensing electrodes and a plurality of second sensing electrodes disposed in the display area; and a sensor controller configured to recognize a touch of a user inputted into the sensor in a touch sensing mode and to recognize a fingerprint of the user inputted into the sensor in a fingerprint sensing mode, wherein the sensor controller changes a mode to the fingerprint sensing mode when no touch is inputted for a predetermined time period in the touch sensing mode and changes the mode to the touch sensing mode when authorization on a fingerprint inputted into the sensor is succeeded in the fingerprint sensing mode.

The sensor controller may drive all the first sensing electrodes and all the second sensing electrodes in the fingerprint sensing mode.

The sensor controller may disable some of the first sensing electrodes and some of the second sensing electrode in the touch sensing mode.

The sensor controller may group the first sensing electrodes into a plurality of first sensing electrode groups and may group the second sensing electrodes into a plurality of second sensing electrode groups to drive them in the touch sensing mode.

The sensor controller may disable some of the first sensing electrode in each of the plurality of first sensing electrode groups and some of the second sensing electrode in each of the plurality of second sensing electrode groups in the touch sensing mode.

The sensor controller may further includes: a fingerprint storage configured to store at least one reference fingerprint; and a fingerprint authorizing unit configured to recognize the fingerprint of the user inputted into the sensor in the fingerprint sensing mode, to compare the recognized fingerprint with the reference fingerprint, and to determine that the authorization is succeeded when the recognized fingerprint is identical to the reference fingerprint.

The fingerprint storage may store reference fingerprints set for each of a plurality of users, the fingerprint authorizing unit may transfer user information related to a user who succeeds authorization to the display controller, and the display controller may control the display unit to display images that are different for each of the users on the display area by referring to the user information.

The fingerprint storage may store a plurality of reference fingerprints, and the fingerprint authorizing unit may recognize a plurality of fingerprints of the user inputted into the sensor in the fingerprint sensing mode, may compare the recognized fingerprints with the reference fingerprints, and may determine that authorization is succeeded when a number of the recognized fingerprints that are identical to the reference fingerprints is equal to or greater than a predetermined reference number.

The sensor controller may drive all the first sensing electrodes and all the second sensing electrodes in the touch sensing mode, recognizes the touch and the fingerprint of the user inputted into the sensor in the touch sensing mode together, and detects a touch pressure of the user touch through a form variation of the recognized fingerprint.

The first sensing electrodes and the second sensing electrodes may be disposed to cross each other.

An exemplary embodiment of the present inventive concept provides a driving method of a display device, including: recognizing a touch of a user inputted into a sensor in a touch sensing mode; when no touch is inputted into the sensor for a predetermined time period in the touch sensing mode, changing a mode from the touch sensing mode to a fingerprint sensing mode; recognizing a fingerprint of the user inputted into the sensor in the fingerprint sensing mode; and authorizing the fingerprint inputted into the sensor in the fingerprint sensing mode and, when the authorization is succeeded, changing the mode to the touch sensing mode, wherein the sensor includes a plurality of first sensing electrodes and a plurality of second sensing electrodes disposed in a display area.

All the first sensing electrodes and all the second sensing electrodes may be driven in the fingerprint sensing mode.

Some of the first sensing electrodes and some of the second sensing electrode may be disabled in the touch sensing mode.

The first sensing electrodes may be grouped into a plurality of first sensing electrode groups and the second sensing electrodes may be grouped into a plurality of second sensing electrode groups to drive them in the touch sensing mode.

Some of the first sending electrodes in each of the plurality of first sensing electrode groups and some of the second sending electrodes in each of the plurality of second sensing electrode groups may be disabled in the touch sensing mode.

The authorizing of the fingerprint may include comparing the fingerprint of the user recognized in the fingerprint sensing mode with a reference fingerprint stored in a fingerprint storage and determining that the authorization is succeeded when the recognized fingerprint is identical to the reference fingerprint.

The fingerprint storage may store reference fingerprints set for each of a plurality of users, and images that are different for each of the users may be displayed on the display by referring to user information related to a user who succeeds the authorization in the authorizing of the fingerprint.

The fingerprint storage may stores a plurality of reference fingerprints, a plurality touch of the user inputted into the sensor in the fingerprint sensing mode may be recognized in the recognizing of the fingerprint, and the authorization may be determined to be succeeded when a number of the recognized fingerprints that are identical to the reference fingerprints is equal to or greater than a predetermined reference number in the authorizing of the fingerprint.

All the first sensing electrodes and all the second sensing electrodes may be driven in the touch sensing mode, and the touch and the fingerprint of the user inputted into the sensor in the touch sensing mode may be recognized together and a touch pressure of the user is detected through a form variation of the recognized fingerprint in the recognizing of the touch.

The first sensing electrodes and the second sensing electrodes may be disposed to cross each other.

As such, according to the exemplary embodiments of the present inventive concept, it is possible to provide a display device having both a touch recognizing function and a fingerprint recognizing function, and a driving method thereof.

DETAILED DESCRIPTION OF THE EMBODIMENTS

Figure 1:
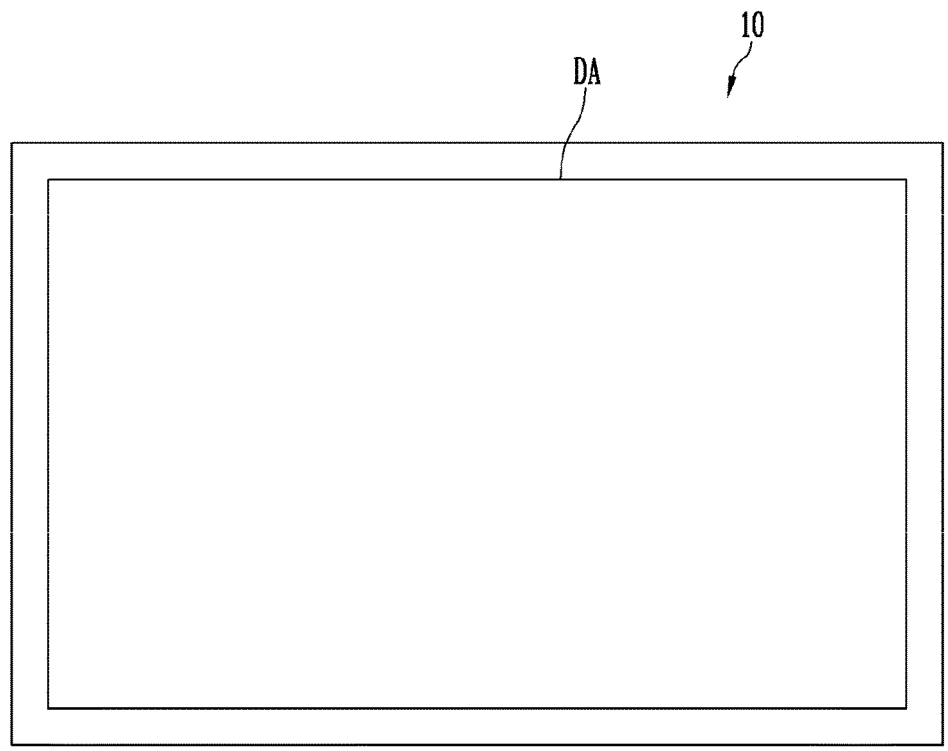
FIG. 1 illustrates a display area of a display device according to an exemplary embodiment of the present inventive concept.

Specific details of other embodiments are included in the detailed description and drawings.

Advantages and features of the present inventive concept and methods to achieve them will be elucidated through exemplary embodiments described below in detail with reference to the accompanying drawings. However, the present inventive concept is not limited to exemplary embodiments set forth herein, and may be embodied in various different forms. Further, the drawings and description are to be regarded as illustrative in nature and not restrictive. Like reference numerals designate like elements throughout the specification.

Hereinafter, a display device and a driving method thereof according to exemplary embodiments of the present inventive concept will be described with reference to related drawings.

Figure 2:
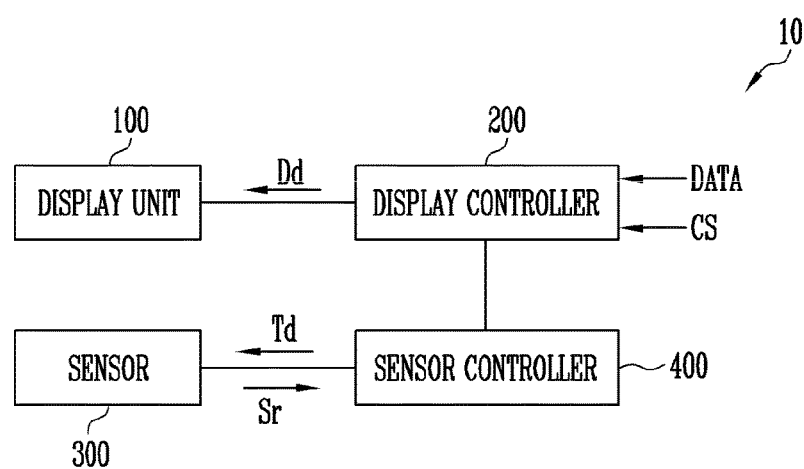
FIG. 2 illustrates a structure of a display device according to an exemplary embodiment of the present inventive concept.

FIG. 1 illustrates a display area of a display device according to an exemplary embodiment of the present inventive concept, and FIG. 2 illustrates a structure of a display device according to an exemplary embodiment of the present inventive concept.

Referring to FIG. 1, the display device 10 according to the present exemplary embodiment may include a display area DA on which images are displayed.

The display device 10 serving to provide images to users may display images on the display area DA.

Accordingly, the users of the display device 10 can watch the images displayed on the display area DA.

Further, the display device 10 can recognize a touch and a fingerprint of a specific user inputted through the display area DA for convenience of manipulation and security.

Referring to FIG. 2, the display device 10 according to the exemplary embodiment of the present inventive concept may include a display unit 100, a display controller 200, a sensor 300, and a sensor controller 400.

The display unit 100 may include a plurality of pixels disposed in the display area DA, and may display images on the display area DA through the pixels.

For example, the display unit 100 may display images under the control of the display controller 200.

Further, the display unit 100 may be embodied as an organic light emitting display panel, a liquid crystal display panel, and a plasma display panel, but is not limited thereto.

The display controller 200 may control an image display operation of the display unit 100 by supplying an image driving signal Dd to the display unit 100.

The display controller 200 may generate an image driving signal Dd by using a control signal Cs and an image data DATA supplied from the outside.

For example, the display controller 200 may receive the image data DATA and the control signal Cs from a host (not shown), and the control signal Cs may include a vertical synchronization signal, a horizontal synchronization signal, a main clock signal, and the like.

Further, the image driving signal Dd may include a data signal generated by using a scanning signal and the image data DATA.

For example, the display controller 200 may be connected with the display unit 100 through an additional constituent element (e.g., a circuit board).

In another exemplary embodiment, the display controller 200 may be directly disposed in the display unit 100.

The sensor 300 may serve to receive a user's touch or fingerprint through the display area DA and to sense the touch or fingerprint.

For this purpose, the sensor 300 may include a plurality of sensing electrodes disposed in the display area DA.

For example, the sensor 300 may be embodied as a capacitive type touch sensor, and may have high-resolution detectability (e.g., 500 pixels per inch; ppi) for recognizing a fingerprint.

The sensor 300 may be operated in a touch sensing mode (e.g., low resolution mode) for recognizing the user's touch or in a fingerprint sensing mode (e.g., high resolution mode) for recognizing a user fingerprint.

The sensor controller 400 may control an operation of the sensor 300.

For example, the sensor controller 400 may drive the sensor 300 by supplying a touch driving signal Td to the sensor 300.

Further, the sensor controller 400 may recognize a touch position and a fingerprint of a user inputted into the sensor 300 by using a detection signal Sr outputted from the sensor 300.

For example, the sensor controller 400 may recognize a user touch inputted into the sensor 300 in the touch sensing mode, and may recognize a user fingerprint inputted into the sensor 300 in the fingerprint sensing mode.

Further, the sensor controller 400 may determine a sensing mode depending on a specific condition, and may adjust the detectability (e.g., resolution of the sensor 300; a high resolution or a low resolution) of the sensor 300 depending on the determined sensing mode.

For example, the sensor controller 400 may change the mode from the touch sensing mode to the fingerprint sensing mode when no touch is inputted into the sensor 300 for a predetermined time.

In addition, when authorization for the fingerprint inputted into the sensor 300 is completed in the fingerprint sensing mode, the mode may be changed to the touch sensing mode.

Figure 3:
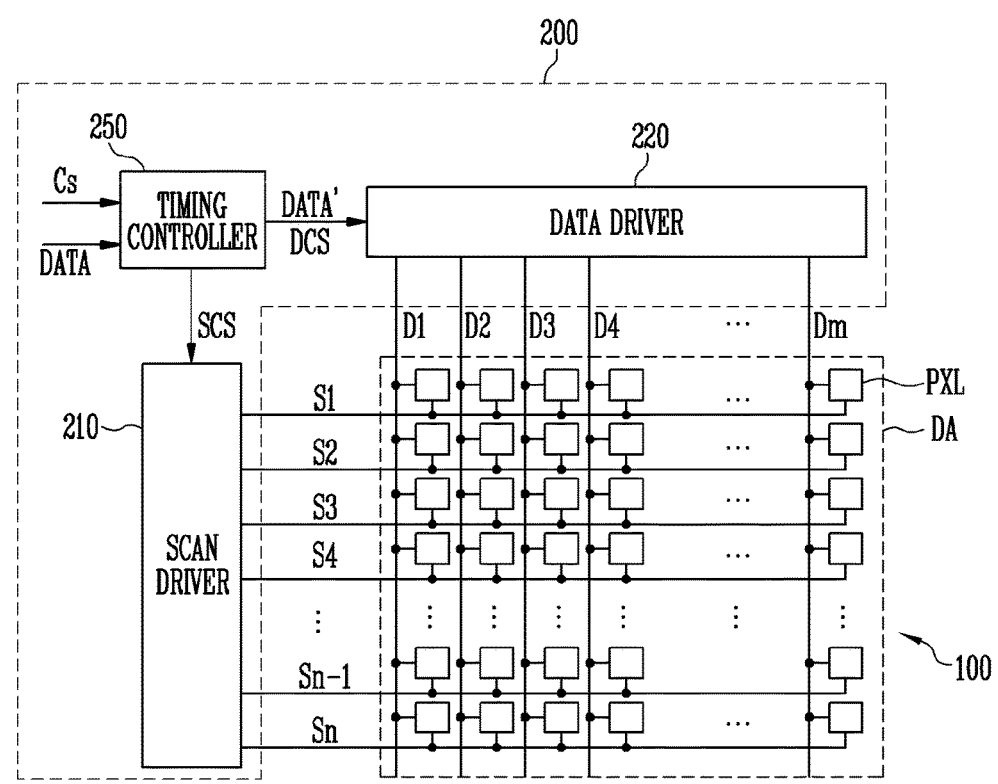
FIG. 3 illustrates a display unit and a display controller according to an exemplary embodiment of the present inventive concept.

FIG. 3 illustrates a display unit and a display controller according to an exemplary embodiment of the present inventive concept.

Referring to FIG. 3, the display unit 100 according to the present exemplary embodiment may include a plurality of data lines D1-Dm, a plurality of scanning lines S1-Sn, and a plurality of pixels PXL.

The pixels PXL may be disposed in the display area DA, and may be connected with respective data lines D1-Dm and scanning lines S1-Sn.

The pixels PXL may receive data signals and scanning signals through the data lines D1-Dm and the scanning lines S1-Sn.

The data lines D1-Dm may be connected between the data driver 220 and the pixels PXL, and the scanning lines S1-Sn may be connected between the scan driver 210 and the pixels PXL.

For example, the scanning lines S1-Sn and the data lines D1-Dm may be disposed to cross each other.

Referring to FIG. 3, the display controller 200 according to the present exemplary embodiment may include a scan driver 210, a data driver 220, and a timing controller 250.

The scan driver 210 may generate scanning signals under control of the timing controller 250 to supply the generated scanning signals to the scanning lines S1-Sn.

Accordingly, each of the pixels PXL may receive the scanning signals through the scanning lines S1-Sn.

For example, the scan driver 210 may receive scan driver control signals SCS from the timing controller 250 to generate corresponding scanning signals.

The scan driver 210 may be electrically connected with the scanning lines S1-Sn disposed in the display unit 100 through an additional constituent element (e.g., a circuit board).

In another exemplary embodiment, the scan driver 210 may be directly formed in the display unit 100.

The data driver 220 may generate data signals under the control of the timing controller 250 to supply the generated data signals to the data lines D1-Dm.

Accordingly, the pixels PXL may receive the data signals through the data lines D1-Dm.

For example, the data driver 220 may receive the image data DATA and a data driver control signal DCS from the timing controller 250 to generate data signal corresponding thereto.

In addition, the data driver 220 may supply the generated data signals to each of the pixels PXL by synchronizing the generated data signals with the scanning signals of the scan driver 210.

The data driver 220 may be electrically connected with the data lines D1-Dm disposed in the display unit 100 through an additional constituent element (e.g., a circuit board).

In another exemplary embodiment, the data driver 220 may be directly disposed in the display unit 100.

The timing controller 250 may control the scan driver 210 and the data driver 220.

For example, the timing controller 250 may generate the scan driver control signals SCS by using the control signals Cs supplied from the outside, for example, a graphic controller (not shown), and may control an operation of the scan driver 210 by supplying the scan driver control signals SCS to the scan driver 210.

The timing controller 250 may convert the image data DATA supplied from the outside to an image data DATA suitable for the data driver 220 to supply the converted image data DATA' to the data driver 220.

Further, the timing controller 250 may generate the data driver control signals DCS by using the control signal Cs supplied from the outside, and may control an operation of the data driver 220 by supplying the data driver control signals DCS to the data driver 220.

For better comprehension and ease of description, the constituent elements included in the display controller 200 has been individually illustrated, but at least some of the constituent elements may be integrated into one constituent element.

Figure 4:
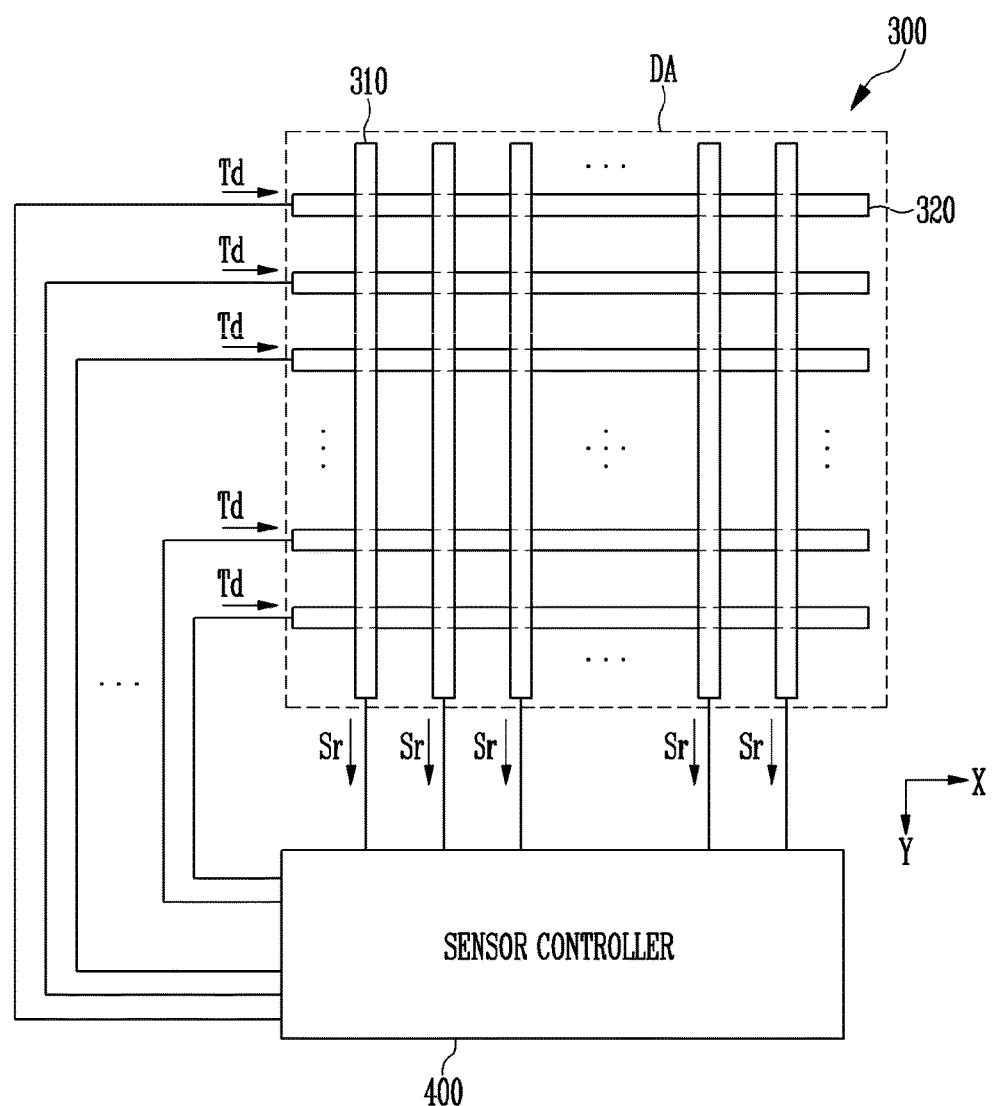
FIG. 4 illustrates a sensor and a sensor controller according to an exemplary embodiment of the present inventive concept.

FIG. 4 illustrates a sensor and a sensor controller according to an exemplary embodiment of the present inventive concept.

Referring to FIG. 4, the sensor 300 according to the present exemplary embodiment may include a plurality of first sensing electrodes 310 and a plurality of second sensing electrodes 320 disposed in the display area DA.

The first sensing electrodes 310 may be formed to extend in a first direction (e.g., Y-axis direction), and may be disposed in a row in a second direction (e.g., X-axis direction) crossing the first direction.

The second sensing electrodes 320 may be disposed to be insulated from the first sensing electrodes 310, and thus may be operated as capacitive type touch sensors together with the first sensing electrodes 310.

For example, the second sensing electrodes 320 may be disposed to cross the first sensing electrodes 310.

The second sensing electrodes 320 may be formed to extend in the second direction (e.g., X-axis direction), and may be disposed in a row in the first direction (e.g., Y-axis direction) crossing the second direction.

As the first sensing electrodes 310 and the second sensing electrodes 320 are disposed to cross each other, mutual capacitance is formed at crossing points therebetween, and the crossing points at which the mutual capacitance is formed may respectively serve as sensing cells for implementing touch recognition and fingerprint recognition.

An insulating layer (not shown) may be disposed between the first sensing electrodes 310 and the second sensing electrodes 320 in order to prevent the first sensing electrodes 310 and the second sensing electrodes 320 from contacting.

The insulating layer may be formed in a whole area between the first sensing electrodes 310 and the second sensing electrodes 320, or may be locally formed around crossing points between the first sensing electrodes 310 and the second sensing electrodes 320

The first sensing electrodes 310 and the second sensing electrodes 320 may be formed of a transparent conductive material, or may be formed of another conductive material such as an opaque metal.

For example, the first sensing electrodes 310 and the second sensing electrodes 320 may be formed of ITO (Indium Tin Oxide), IZO (Indium Zinc Oxide), graphene, carbon nanotube, AgNWs (Silver Nanowires, or the like.

The first sensing electrodes 310 may be driven by receiving the touch driving signal Td from the sensor controller 400, and the second sensing electrodes 320 may output a detection signal Sr to which a capacitance variation is reflected to the sensor controller 400.

The sensor controller 400 may supply the touch driving signal Td to the first sensing electrodes 310, and may recognize a touch position and a fingerprint by using the detection signal Sr outputted from the second sensing electrodes 320.

Further, the sensor controller 400 may adjust detectability of the sensor 300 depending on the sensing mode.

For example, in the fingerprint sensing mode, the sensor controller 400 can individually drive all the first sensing electrodes 310 and the second sensing electrodes 320.

Further, in the touch sensing mode, the sensor controller 400 may drive some of the first sensing electrodes 310 and some of the second sensing electrodes 320.

In general, the sensor controller 400 may group the first sensing electrodes 310 and may group the second sensing electrodes 320 to drive them during the touch sensing mode. In this case, the sensor controller 400 may disable some of the first sensing electrodes 310 in the first sensing electrode groups and some of the second sensing electrodes 320 in the second sensing electrode groups. For example, the sensor controller 400 may drive one of the first sensing electrodes 310 in each of the first sensing electrode groups and one of the second sensing electrodes 320 in each of the second sensing electrode groups.

Figure 5:
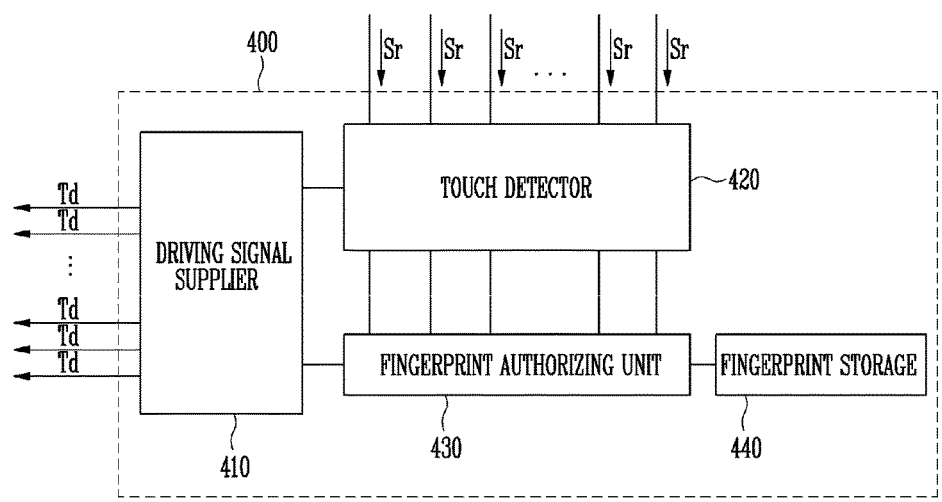
FIG. 5 illustrates a structure of a sensor controller according to an exemplary embodiment of the present inventive concept.

FIG. 5 illustrates a structure of a sensor controller according to an exemplary embodiment of the present inventive concept.

Referring to FIG. 5, the sensor controller 400 according to the exemplary embodiment of the present inventive concept may include a driving signal supplier 410, a touch detector 420, a fingerprint authorizing unit 430, and a fingerprint storage 440.

The driving signal supplier 410 may supply the touch driving signal Td to the first sensing electrodes 310 of the sensor 300.

For example, the driving signal supplier 410 may variously determine a supply method of the touch driving signal Td to correspond to the current sensing mode.

The touch detector 420 may recognize a user's touch inputted into the sensor 300 by using the detection signal Sr outputted from the second sensing electrodes 320.

For example, the touch detector 420 may detect a touch position inputted in the touch sensing mode.

The fingerprint authorizing unit 430 may recognize a user fingerprint inputted into the sensor 300 by using the detection signal Sr outputted from the second sensing electrodes 320.

For example, the fingerprint authorizing unit 430 may detect a fingerprint inputted in the fingerprint sensing mode.

The fingerprint storage 440 may store at least one reference fingerprint.

In this case, the fingerprint authorizing unit 430 may compare the fingerprint recognized in the fingerprint sensing mode with the reference fingerprint stored in the fingerprint storage 440, and when the two fingerprint are identical to each other, may determine that the authorization is succeeded.

Next, the fingerprint authorizing unit 430 may end the fingerprint sensing mode, and may change the mode to the touch sensing mode.

In addition, when no touch is inputted in the touch sensing mode for a predetermined time, the touch detector 420 may end the touch sensing mode and may change the mode to the fingerprint sensing mode.

For better comprehension and ease of description, the touch detector 420 and the fingerprint authorizing unit 430 have been separately illustrated in FIG. 5, but the touch detector 420 and the fingerprint authorizing unit 430 may be integrated into one component.

FIG. 6A to FIG. 6D illustrate a driving method of a sensor according to an exemplary embodiment of the present inventive concept.

Figure 6A:
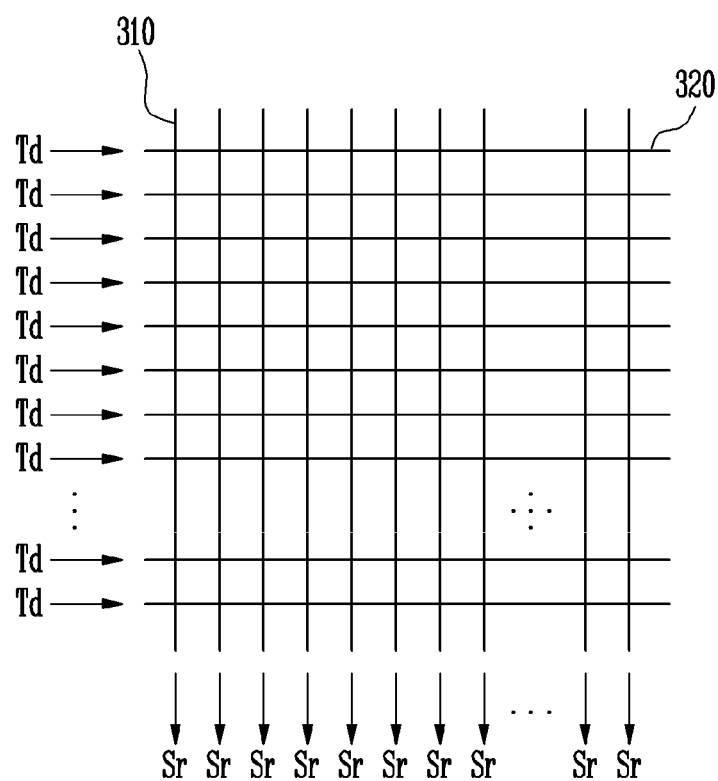
FIG. 6A, 6B, 6C and FIG. 6D illustrate a driving method of a sensor according to an exemplary embodiment of the present inventive concept.

FIG. 6A illustrates a method of individually driving all the sensing electrodes 310 and 320, which is may be used in the fingerprint sensing mode requiring high resolution detectability.

For example, the sensor controller 400 may individually drive all the first sensing electrodes 310 and all the second sensing electrodes 320 in the fingerprint sensing mode.

Specifically, the sensor controller 400 may supply the touch driving signals Td to all the first sensing electrodes 310, and may recognize a user's fingerprint by using the detection signals Sr outputted from all the second sensing electrodes 320.

For example, the driving signal supplier 410 may sequentially supply the touch driving signals Td to all the first sensing electrodes 310, and the fingerprint authorizing unit 430 may receive the detection signals Sr from all the second sensing electrodes 320.

Figure 6B:
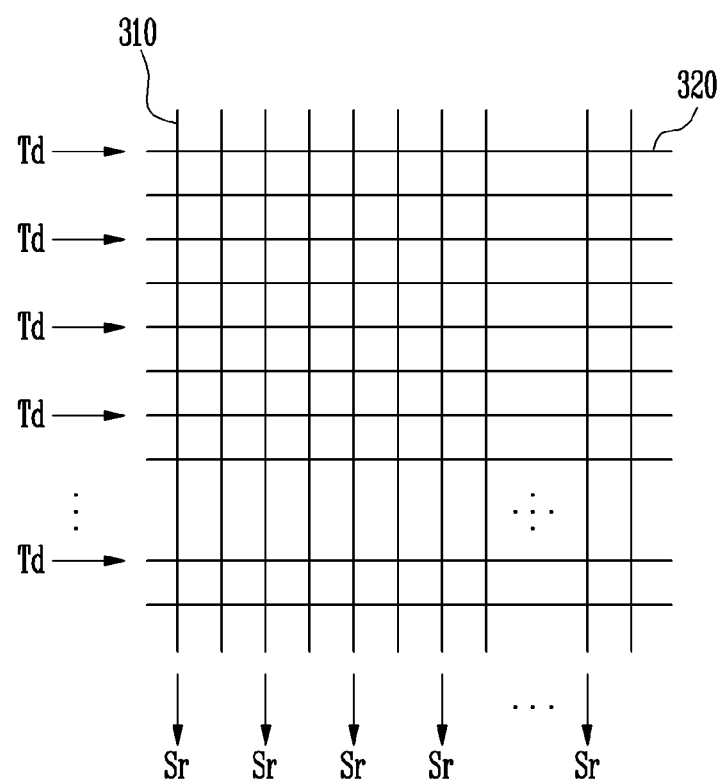

FIG. 6B illustrates a method of driving a portion of the sensing electrodes 310 and 320, which may be used in the touch sensing mode requiring low resolution detectability as compared with the fingerprint sensing mode.

The sensor controller 400 may drive some of the first sensing electrodes 310 and some of the second sensing electrodes 320 in the touch sensing mode.

For example, the sensor controller 400 may drive the sensor 300 by using disabling at least one sensing electrode.

Specifically, the driving signal supplier 410 may disable at least one first sensing electrode 310 and may supply the touch driving signals Td to the remaining first sensing electrodes 310, and the touch detector 420 may disable at least one second sensing electrode 320 and may receive the detection signals Sr from the remaining second sensing electrodes 320.

In this case, the touch detector 420 may detect a touch position inputted in the touch sensing mode by using the detection signals Sr received from the second sensing electrodes 320.

FIG. 6B illustrates a case that one of two neighboring sensing electrodes is disabled, but the number of the sensing electrodes to be disabled may be variously adjusted.

Figure 6C:
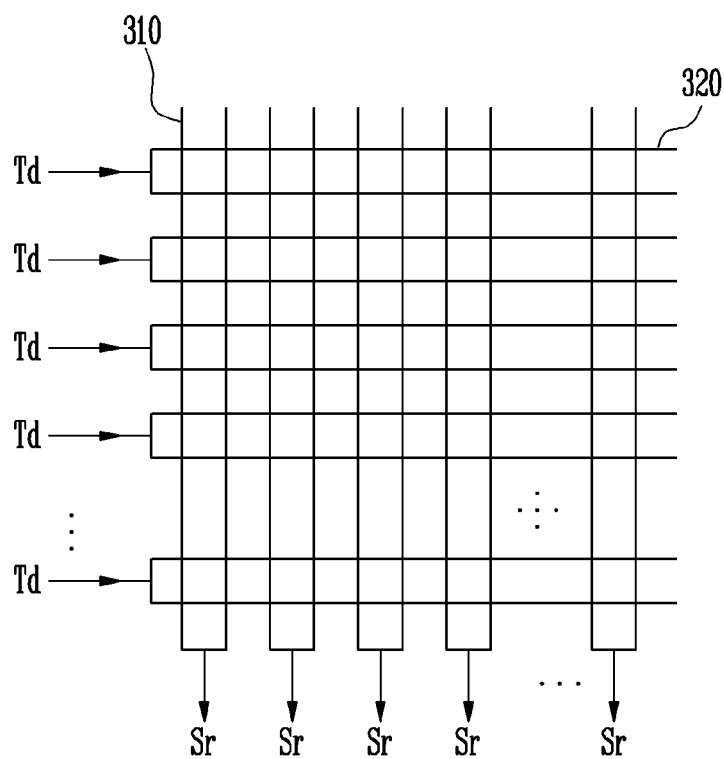

FIG. 6C illustrates a method of grouping and driving the sensing electrodes 310 and 320, which may be used in the touch sensing mode requiring low resolution detectability as compared with the fingerprint sensing mode.

The sensor controller 400 may group and drive the first sensing electrodes 310 and the second sensing electrodes 320 in the touch sensing mode.

For example, the sensor controller 400 may divide the sensing electrodes 310 and 320 into a plurality of groups by setting predetermined numbers of sensing electrodes 310 and 320 in each group.

In this case, the sensor controller 400 may drive the sensing electrodes 310 and 320 in each group as one sensing electrode.

For example, the driving signal supplier 410 may supply the same touch driving signal Td to the second sensing electrodes 320 in the same group, and the touch detector 420 may receive the detection signals Sr from the each group of the second sensing electrodes 320.

In this case, the touch detector 420 may detect a touch position inputted in the touch sensing mode by using the detection signals Sr received from the each group of the second sensing electrodes 320.

FIG. 6C illustrates a case that the two sensing electrodes 310 and 320 are included in one group, respectively, but the numbers of the sensing electrodes 310 and 320 included in one group may be respectively variously changed.

Figure 6D:
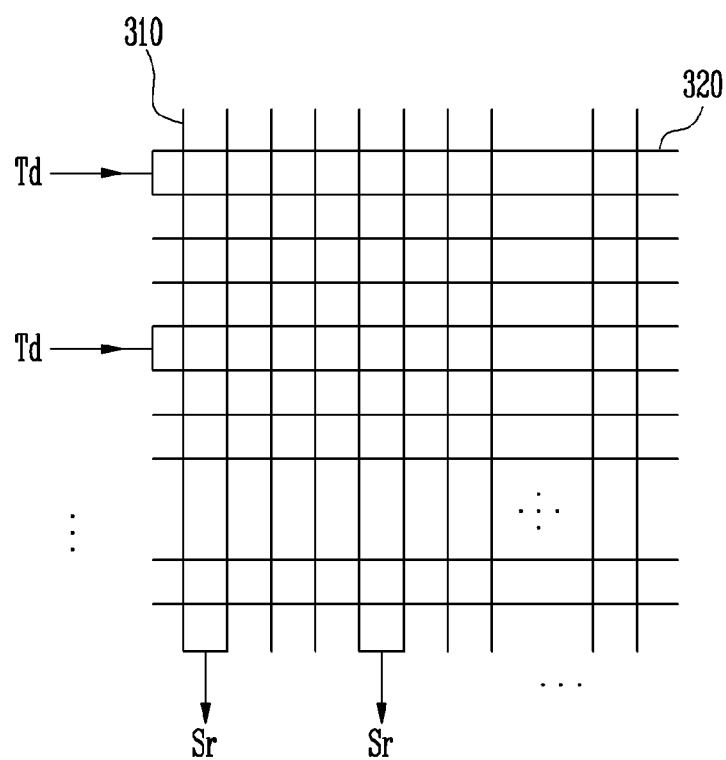

FIG. 6D illustrates a method of driving some of groups of the sensing electrodes 310 and 320, which may be used in the touch sensing mode requiring the low resolution detectability as compared with the fingerprint sensing mode.

The sensor controller 400 may group the first sensing electrodes 310 and the second sensing electrodes 320 and drive portions of the groups of the first sensing electrodes 310 and portions of the groups of the second sensing electrodes 320 in the touch sensing mode.

For example, the sensor controller 400 may disable a portion of the groups of the first sensing electrodes 310 and a portion of the groups of the second sensing electrodes 320 in the touch sensing mode.

Specifically, the driving signal supplier 410 may disable one of two neighboring groups of the first sensing electrodes 310 and may supply the touch driving signals Td to the remaining groups, and the touch detector 420 may disable one of two neighboring groups of the second sensing electrodes 320 and may receive the detection signals Sr from the remaining groups for each group.

In this case, the touch detector 420 may detect a touch position inputted in the touch sensing mode by using the detection signals Sr received from some of the groups of the second sensing electrodes 320.

FIG. 6D illustrates a case that one of two groups is disabled, but the number of the groups to be disabled may be variously adjusted.

Figure 7:
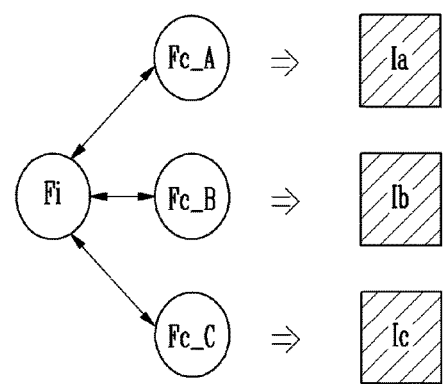
FIG. 7 illustrates an exemplary embodiment of the present inventive concept in which different images for each user.

FIG. 7 illustrates an exemplary embodiment of the present inventive concept in which different images for each user.

Referring to FIG. 2, FIG. 5, and FIG. 7, the fingerprint storage 440 according to the exemplary embodiment of the present inventive concept may store reference fingerprints Fc_A, Fc_B, and Fc_C for each user.

For example, the fingerprint storage 440 may store a reference fingerprint Fc_A of a user A, a reference fingerprint Fc_B of a user B, and a reference fingerprint Fc_C of a user C.

In this case, the reference fingerprints Fc_A, Fc_B, and Fc_C of the users A, B, and C may pre-inputted into the sensor 300 and may be stored in the fingerprint storage 440.

FIG. 7 illustrates a case that one reference fingerprint Fc_A, Fc_B, and Fc_C is stored for each the users A, B, and C, but a plurality of reference fingerprints may be stored for each user.

The fingerprint authorizing unit 430 may recognize a fingerprint Fi inputted into the sensor 300 to perform authorization of the fingerprint in the fingerprint recognizing mode.

Specifically, the fingerprint authorizing unit 430 may compare the recognized fingerprint Fi with the reference fingerprints Fc_A, Fc_B, and Fc_C, and when the recognized fingerprint Fi is identical to one of the reference fingerprints Fc_A, Fc_B, and Fc_C, may determine that the authorization is succeeded.

In other words, the fingerprint authorizing unit 430 may determine that the authorization is succeeded when there is a reference fingerprint that is identical to the recognized fingerprint Fi in the fingerprint storage 440, and may determine that the authorization is failed when there is no reference fingerprint that is identical to the recognized fingerprint Fi in the fingerprint storage 440.

Further, the fingerprint authorizing unit 430 may transfer user information related to a user who succeeds the authorization to the display controller 200.

In this case, the display controller 200 may control the display unit 100 to display images Ia, Ib, and Ic that are different for each user on the display area DA by referring to the user information transferred from the fingerprint authorizing unit 430.

For example, when an inputted fingerprint Fi is identical to the reference fingerprint Fc_A of the user A, the first image Ia may be displayed on the display area DA. When the inputted fingerprint Fi is identical to the reference fingerprint Fc_B of the user B, the second image Ib may be displayed on the display area DA. When the inputted fingerprint Fi is identical to the reference fingerprint Fc_C of the user C, the third image Ic may be displayed on the display area DA.

Accordingly, the display device 10 according to the present exemplary embodiment may provide UI/UX (User Interface/User experience) that is different for each user.

Figure 8:
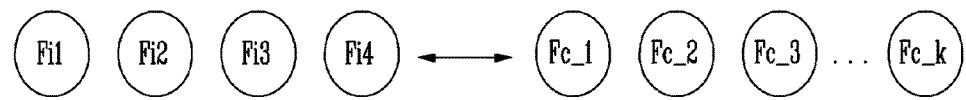
FIG. 8 illustrates how authorization is performed by using a plurality of fingerprints.

FIG. 8 illustrates how authorization is performed by using a plurality of fingerprints.

Referring to FIG. 5 and FIG. 8, the fingerprint storage 440 according to the present exemplary embodiment may store a plurality of reference fingerprints Fc_1, Fc_2, Fc_3 . . . , and Fc_k. (k is a natural number that is equal to or greater than 2)

In the fingerprint recognizing mode, the fingerprint authorizing unit 430 may recognize a plurality of fingerprints Fi1, Fi2, Fi3, and Fi4 inputted into the sensor 300, and may perform authorization on the recognized fingerprints Fi1, Fi2, Fi3, and Fi4.

Specifically, the fingerprint authorizing unit 430 may compare the recognized fingerprints Fi1, Fi2, Fi3, and Fi4 with the reference fingerprints Fc_1, Fc_2, Fc_3 . . . , and Fc_k, and when the number of the recognized fingerprints Fi1, Fi2, Fi3, and Fi4 that are identical to the reference fingerprints Fc_1, Fc_2, Fc_3 . . . , and Fc_k is equal to or greater than a reference number, the fingerprint authorizing unit 430 may determine that the authorization is succeeded.

For example, in the case that the reference number is preset as 2, when there are the reference fingerprints that are identical to two or more of the inputted fingerprints Fi1, Fi2, Fi3, and Fi4 in the fingerprint storage 440, the fingerprint authorizing unit 430 may determine that the authorization is succeeded.

In this case, in the fingerprint sensing mode, the fingerprints Fi1, Fi2, Fi3, and Fi4 may be simultaneously or sequentially inputted into the sensor 300, and the reference number may be variously adjusted.

For example, the fingerprints Fi1, Fi2, Fi3, and Fi4 may be fingerprints of different fingers.

Figure 9:
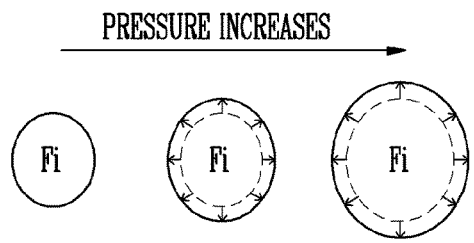
FIG. 9 illustrates an exemplary embodiment of the present inventive concept in which a pressure is detected by using form variation of fingerprints.

FIG. 9 illustrates an exemplary embodiment of the present inventive concept in which a pressure is detected by using fingerprints.

Referring to FIG. 4, FIG. 5, and FIG. 9, as a pressure applied to the sensor 300 is increased, a shape of the fingerprint Fi inputted into the sensor 300 is variously changed.

For example, as the pressure applied to the sensor 300 is increased, a size of the fingerprint Fi is increased.

By using that, the sensor controller 400 according to the present exemplary embodiment may detect the touch pressure through such form variation.

In order to detect a touch pressure of a user by using the form variation of the recognized fingerprint Fi, the sensor controller 400 may individually drive all the first sensing electrodes 310 and all the second sensing electrodes 320 in the touch sensing mode as in the fingerprint sensing mode. (see FIG. 6A)

For example, the high resolution driving of the sensor 300 for fingerprint recognition and touch recognition may be performed for an entire time period of the touch sensing mode.

In general, the high resolution driving of the sensor 300 of the sensor 300 for fingerprint recognition may be performed for a partial period of the touch sensing mode, and the low resolution driving of the sensor 300 for touch recognition may be performed for another partial period of the touch sensing mode.

Accordingly, in the touch sensing mode, the sensor controller 400 may recognize a touch and a fingerprint Fi of a user together, and may detect a touch pressure through form variation of the recognized fingerprint Fi.

For example, the driving signal supplier 410 may sequentially supply the touch driving signals Td to all the first sensing electrodes 310, the touch detector 420 may detect a touch position by using the detection signals Sr outputted from all the second sensing electrodes 320, and the fingerprint authorizing unit 430 may recognize the form variation by using the detection signals Sr outputted from all the second sensing electrodes 320.

Specifically, the fingerprint authorizing unit 430 may recognize a size of the fingerprint Fi, may calculate a pressure corresponding to the size of the recognized fingerprint Fi, In this case, the fingerprint authorizing unit 430 may refer to an additional table or equation in order to calculate the pressure.

Further, the fingerprint authorizing unit 430 may supply information of the calculated pressure to the display controller 200, and the display controller 200 may control the display unit 100 to display images corresponding to the pressure information on the display area DA.

Figure 10:
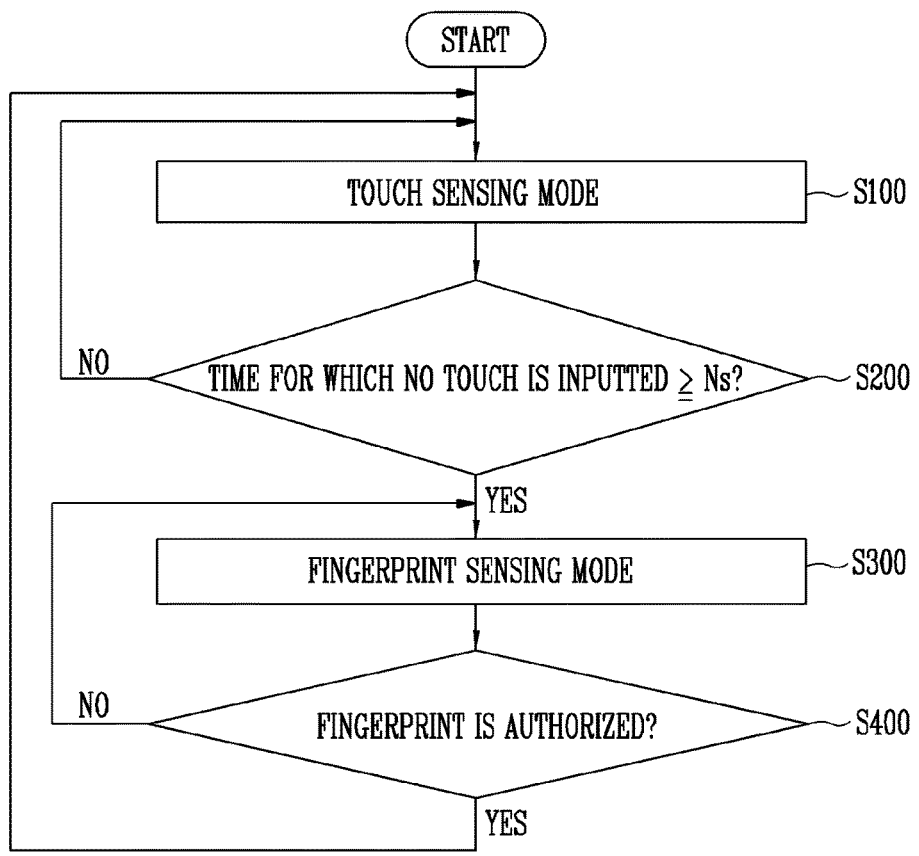
FIG. 10 illustrates a driving method of a display device according to an exemplary embodiment of the present inventive concept.

FIG. 10 illustrates a driving method of a display device according to an exemplary embodiment of the present inventive concept.

Referring to FIG. 10, the driving method of the display device according to the present exemplary embodiment may include touch recognition (S100), mode conversion (S200), fingerprint recognition (S300), and fingerprint authorization (S400).

In the touch recognition (S100), a user's touch input into the sensor 300 may be recognized in the touch sensing mode.

In this case, the sensor 300 may be driven to have low resolution detectability for at least a partial period in the touch recognition (S100).

In the mode conversion (S200), when no touch is inputted into the sensor 300 for a predetermined time period Ns in the touch recognition (S100), the mode may be changed from the touch sensing mode to the fingerprint sensing mode.

Specifically, in the case that a time period for which no touch is inputted is the time period Ns, the mode is changed to the fingerprint sensing mode. In the case that a time period for which no touch is inputted is shorter than the time period Ns, the current mode is continuously maintained as the touch sensing mode.

In the fingerprint recognition (S300), a user's fingerprint inputted into the sensor 300 in the fingerprint sensing mode may be recognized.

In this case, the sensor 300 may be driven to have high resolution detectability for a partial period in the fingerprint recognition (S300).

The driving methods of the sensor 300 for each sensing mode have been described above with reference to FIG. 6A to FIG. 6D, and thus redundant descriptions will be omitted.

In the fingerprint authorization (S400), authorization may be performed on the fingerprint inputted into the sensor 300 in the fingerprint sensing mode, and when the authorization is succeeded, the mode may be changed to the touch sensing mode.

For example, in the fingerprint authorization (S400), the user's fingerprint recognized in the fingerprint recognition (S300) may be compared with a reference fingerprint stored in the fingerprint storage 440, and when the two fingerprints are identical to each other, the authorization may be determined to be succeeded.

Meanwhile, the fingerprint storage 440 may store at least one reference fingerprint for each of a plurality of users, and in this case, an image that is different for each user may be displayed on the display area DA by referring to information of a user who succeeds the authorization in the fingerprint authorization (S400).

This has been described above in detail with reference to FIG. 7, and thus redundant descriptions will be omitted.

Further, the fingerprint storage 440 may store a plurality of reference fingerprints, and in this case, in the fingerprint recognition (S300), fingerprints of a plurality of users inputted into the sensor 300 may be recognized during the fingerprint sensing mode.

In addition, in the fingerprint authorization (S400), the recognized fingerprints of the users may be compared with reference fingerprints, and when the number of the recognized fingerprints that are identical to the reference fingerprints is equal to or greater than a reference number, the authorization may be determined to be succeeded.

This has been described above in detail with reference to FIG. 8, and thus redundant descriptions will be omitted.

To detect a pressure by using a user's fingerprint inputted in the touch sensing mode, the sensor 300 may be driven to have high resolution detectability for at least a partial period of the touch sensing mode.

For example, the first sensing electrodes 310 and the second sensing electrodes 320 included in the sensor 300 may be individually driven in the touch recognition (S100).

In this case, in the touch recognition (S100), a user's touch or a user's fingerprint inputted into the sensor 30 may be recognized together in the touch sensing mode, and a user's touch pressure may be detected through form variation of the recognized fingerprint.

This has been described above in detail with reference to FIG. 9, and thus redundant descriptions will be omitted.

FIG. 11 to FIG. 16 illustrate positions of sensing electrodes according to various exemplary embodiments of the present inventive concept.

Figure 11:
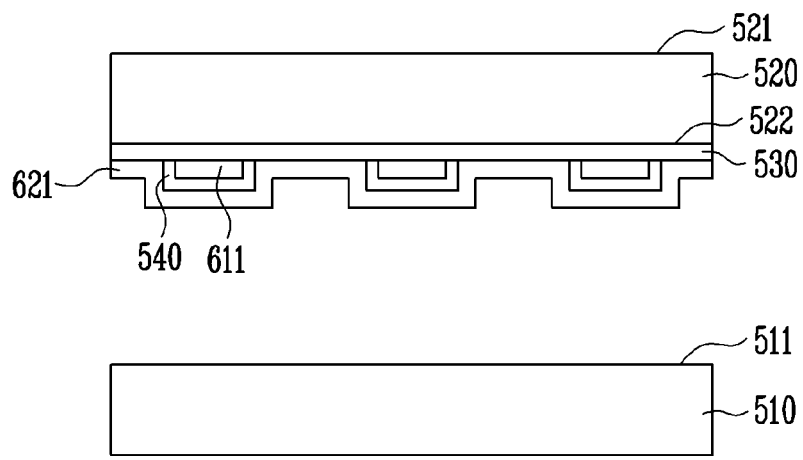
FIG. 11, FIG. 12, FIG. 13, FIG. 14, FIG. 15 and FIG. 16 illustrate positions of sensing electrodes according to various exemplary embodiments of the present inventive concept.

Referring to FIG. 11, a first substrate 510 and a second substrate 520 may be disposed to face each other.

For example, a first surface 511 of the first substrate 510 may face a second surface 522 of the second substrate 520.

Further, a first surface 521 of the second substrate 520 may be disposed on an opposite side of the second surface 522.

Pixels (not shown) may be disposed in the first surface 511 of the first substrate 510, and a black matrix 530 may be disposed in the second surface 522 of the second substrate 520.

In this case, first sensing electrodes 611 and second sensing electrodes 621 may be disposed below the black matrix 530 and an insulating layer 540 may be disposed between the first sensing electrode 611 and the second sensing electrode 621.

Accordingly, the first sensing electrodes 611 and the second sensing electrodes 621 may be overlapped with the black matrix 530.

To prevent the sensing electrodes 611 and 621 from being seen, a width of the black matrix 530 may be set to be wider than that of the sensing electrodes 611 and 621.

In addition, a resolution of the sensing electrodes 611 and 621 may be set to be equal to or smaller than that of the black matrix 530.

Figure 12:
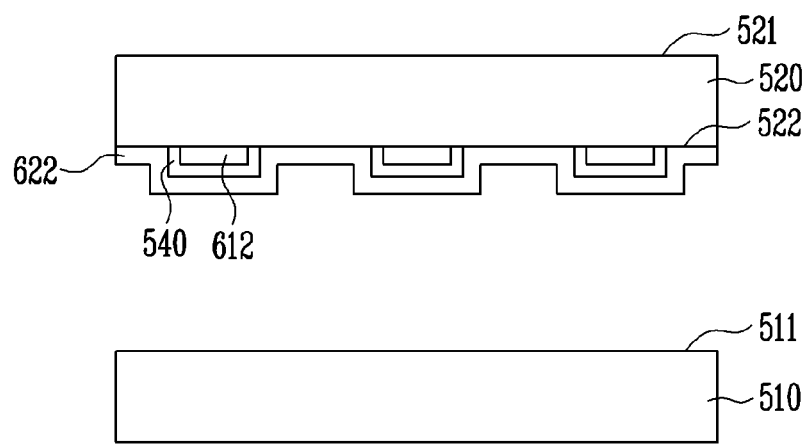

Referring to FIG. 12, the first sensing electrodes 612 and the second sensing electrodes 622 may be directly disposed in the second surface 522 of the second substrate 520.

Further, the first sensing electrodes 612 and the second sensing electrodes 622 may be formed of an opaque conductive material to additionally perform a function of the black matrix.

Figure 13:
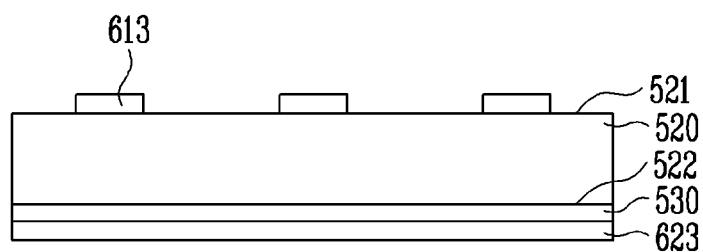
Figure 13:

In this case, the black matrix 530 of FIG. 11 may be omitted,

Referring to FIG. 13, first sensing electrodes 613 may be disposed on the first surface 521 of the second substrate 520, and second sensing electrodes 623 may be disposed below the black matrix 530.

In this case, the second substrate 520 may serve as an insulator between the first sensing electrodes 613 and the second sensing electrodes 623, and thus it is not necessary to separately provide an insulating layer.

Figure 14:
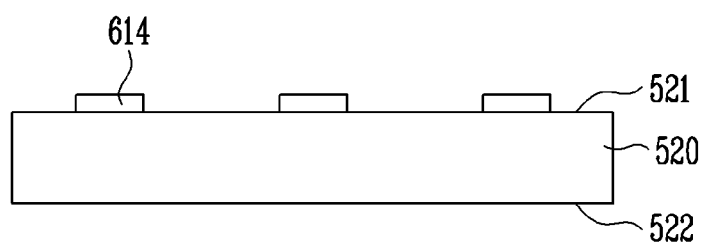
Figure 14:
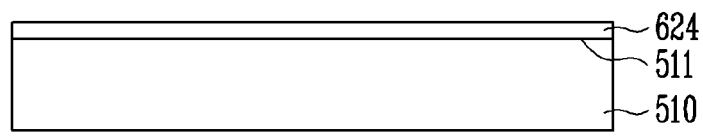

Referring to FIG. 14, first sensing electrodes 614 may be disposed on the first surface 521 of the second substrate 520 and second sensing electrodes 624 may be disposed on the first surface 511 of the first substrate 510.

In this case, the second sensing electrodes 624 may serve as data lines for supplying data signals to the pixels or common electrodes for supplying driving voltages to the pixels.

Figure 15:
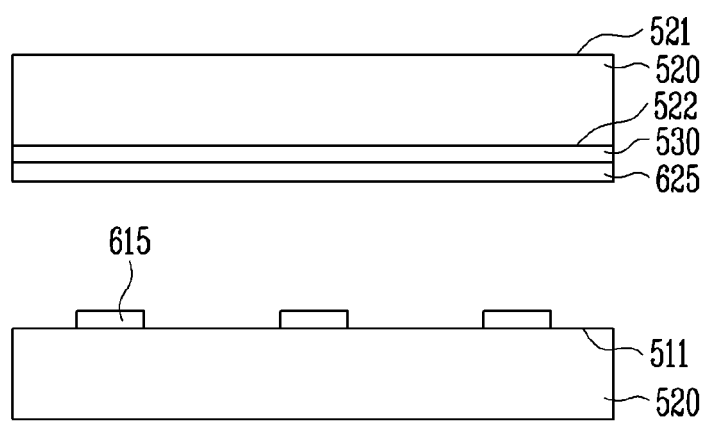

Referring to FIG. 15, first sensing electrodes 615 may be disposed on the first surface 511 of the first substrate 510, and the second sensing electrodes 625 may be disposed below the black matrix 530.

In this case, the first sensing electrodes 615 may additionally serve as data lines for supplying data signals to the pixels or common electrodes for supplying driving voltages to the pixels.

Figure 16:
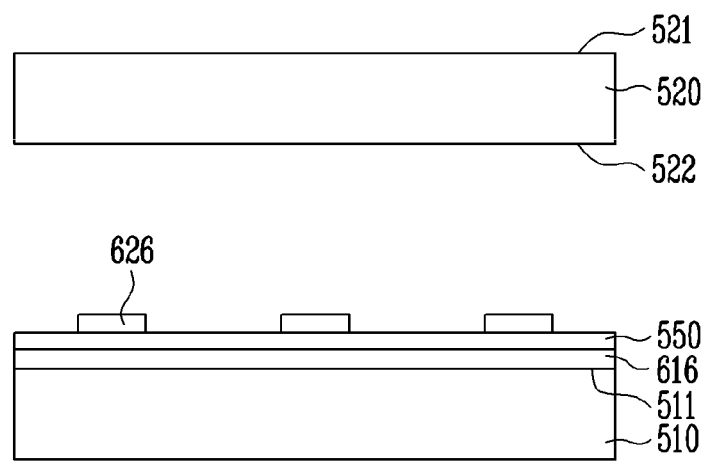

Referring to FIG. 16, first sensing electrodes 616 and second sensing electrodes 626 may be disposed on the first surface 511 of the first substrate 510.

In this case, an insulating layer 550 may be disposed between the first sensing electrodes 616 and the second sensing electrodes 626 to insulate the first sensing electrodes 616 from the second sensing electrodes 626.

For example, as shown in FIG. 16, the insulating layer 550 may be formed in a whole area between the first sensing electrodes 616 and the second sensing electrodes 626, or may be locally formed around crossing points between the first sensing electrodes 616 and the second sensing electrodes 626.

In this case, the first sensing electrodes 616 and the second sensing electrodes 626 may additionally serve as common electrodes for supplying driving voltages to the pixels.

In another exemplary embodiment, the first sensing electrodes 616 may additionally serve as common electrodes for supplying driving voltages to the pixels, and the second sensing electrodes 626 may additionally serve as data lines for supplying data signals to the pixels.

Conversely, the first sensing electrodes 616 may additionally serve as data lines for supplying data signals to the pixels, and the second sensing electrodes 626 may additionally serve as common electrodes for supplying driving voltages to the pixels.

In yet another exemplary embodiment, the first sensing electrodes 616 may additionally serve as scanning lines for supplying scanning signals to the pixels, and the second sensing electrodes 626 may additionally serve as data lines for supplying data signals to the pixels.

Conversely, the first sensing electrodes 616 may additionally serve as data lines for supplying data signals to the pixels, and the second sensing electrodes 626 may additionally serve as scanning lines for supplying scanning signals to the pixels.

In this case, the touch and the fingerprint may be recognized through mutual capacitance variations of the first sensing electrodes 616 and the second sensing electrodes 626. Further, the touch and the fingerprint may be recognized by using a piezo resistive characteristic of transistors included in pixels.

Relating to FIG. 11 to FIG. 16, positions of the first sensing electrodes 611, 612, 613, 614, 615, and 616 and positions of the second sensing electrodes 621, 622, 623, 624, 625, and 626 may be switched.

While this inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims. The scope of the present inventive concept is defined not by the detailed description of the inventive concept but by the appended claims, and all various modifications and equivalent arrangements included within the spirit and scope of the appended claims will be construed as being included in the present inventive concept.

What is claimed is:

1. A display device comprising:
    a display including a plurality of pixels disposed on a display area;
    a display controller including a timing controller and configured to control the display;
    a sensor including a plurality of first sensing electrodes and a plurality of second sensing electrodes disposed in the display area; and
    a sensor controller including a touch detector configured to recognize a touch of a user inputted into the sensor in a touch sensing mode and a fingerprint authorizer configured to recognize a fingerprint of the user inputted into the sensor in a fingerprint sensing mode,
    wherein the sensor controller changes a mode to the fingerprint sensing mode when no touch is inputted for a predetermined time period in the touch sensing mode and changes the mode to the touch sensing mode when authorization on a fingerprint inputted into the sensor is succeeded in the fingerprint sensing mode, and
    wherein the sensor controller sequentially drives all the first sensing electrodes in the fingerprint sensing mode and the sensor controller drives all the second sensing electrodes in the fingerprint sensing mode.

2. The display device of claim 1, wherein the sensor controller drives a portion of the first sensing electrodes and a portion of the second sensing electrodes in the touch sensing mode.

3. The display device of claim 1, wherein the sensor controller groups the first sensing electrodes into a plurality of first sensing electrode groups and the second sensing electrodes into a plurality of second sensing electrode groups and drives the first and second sensing electrode groups in the touch sensing mode.

4. The display device of claim 3, wherein the sensor controller drives a portion of the first sensing electrode groups and a portion of the second sensing electrode groups in the touch sensing mode.

5. The display device of claim 3, wherein the sensor controller disables a portion of the first sensing electrode groups and a portion of the second sensing electrode groups in the touch sensing mode.

6. The display device of claim 1, wherein the sensor controller drives all the first sensing electrodes and all the second sensing electrodes in the touch sensing mode, recognizes the touch and the fingerprint of the user inputted into the sensor in the touch sensing mode together, and detects a touch pressure of the user touch through a form variation of the recognized fingerprint.

7. The display device of claim 1, wherein the sensor controller further includes a fingerprint storage configured to store at least one reference fingerprint, and
    wherein the fingerprint authorizer is configured to recognize the fingerprint of the user inputted into the sensor in the fingerprint sensing mode, to compare the recognized fingerprint with the reference fingerprint, and to determine that the authorization is succeeded when the recognized fingerprint is identical to the reference fingerprint.

8. The display device of claim 7, wherein the fingerprint storage stores reference fingerprints set for each of a plurality of users,
    the fingerprint authorizer transfers user information related to a user who succeeds authorization to the display controller, and
    the display controller controls the display to display images that are different for each of the users on the display area by referring to the user information.

9. The display device of claim 7, wherein the fingerprint storage stores a plurality of reference fingerprints, and
    the fingerprint authorizer recognizes a plurality of fingerprints of a user inputted into the sensor in the fingerprint sensing mode, compares the recognized fingerprints with the reference fingerprints, and determine that authorization is succeeded when a number of the recognized fingerprints that are identical to the reference fingerprints is equal to or greater than a predetermined reference number.

10. The display device of claim 1, wherein the first sensing electrodes and the second sensing electrodes are disposed to cross each other.

11. A driving method of a display device, comprising:
    recognizing a touch of a user inputted into a sensor in a touch sensing mode;
    when no touch is inputted into the sensor for a predetermined time period in the touch sensing mode, changing a mode from the touch sensing mode to a fingerprint sensing mode;
    recognizing a fingerprint of the user inputted into the sensor in the fingerprint sensing mode; and
    authorizing the fingerprint inputted into the sensor in the fingerprint sensing mode and, when the authorization is succeeded, changing the mode to the touch sensing mode,
    wherein the sensor includes a plurality of first sensing electrodes and a plurality of second sensing electrodes disposed in a display area, and
    wherein all the first sensing electrodes and all the second sensing electrodes are driven in the fingerprint sensing mode.

12. The driving method of claim 11, wherein a portion of the first sensing electrodes and a portion of the second sensing electrodes are driven in the touch sensing mode.

13. The driving method of claim 11, wherein the first sensing electrodes are grouped into a plurality of first sensing electrode groups, the second sensing electrodes are grouped into a plurality of second sensing electrode groups, and the first and second sensing electrode groups are driven in the touch sensing mode.

14. The driving method of claim 13, wherein a portion of the first sensing electrode groups and a portion of the second sensing electrode groups are driven in the touch sensing mode.

15. The driving method of claim 11, wherein all the first sensing electrodes and all the second sensing electrodes are driven in the touch sensing mode, and the touch and the fingerprint of the user inputted into the sensor in the touch sensing mode are recognized together and a touch pressure of the user is detected through a form variation of the recognized fingerprint in the recognizing of the touch.

16. The driving method of claim 11, wherein the authorizing of the fingerprint includes comparing the fingerprint of the user recognized in the fingerprint sensing mode with a reference fingerprint stored in a fingerprint storage and determining that the authorization is succeeded when the recognized fingerprint is identical to the reference fingerprint.

17. The driving method of claim 16, wherein the fingerprint storage stores reference fingerprints set for each of a plurality of users, and images that are different for each of the users are displayed on the display by referring to user information related to a user who succeeds the authorization in the authorizing of the fingerprint.

18. The driving method of claim 16, wherein the fingerprint storage stores a plurality of reference fingerprints, a plurality of touch of the user inputted into the sensor in the fingerprint sensing mode are recognized in the recognizing of the fingerprint, and the authorization is determined to be succeeded when a number of the recognized fingerprints that are identical to the reference fingerprints are equal to or greater than a predetermined reference number in the authorizing of the fingerprint.

* * * * *